United States Patent [19]
Shariat

[11] Patent Number: 5,967,135
[45] Date of Patent: Oct. 19, 1999

[54] COOKING DEVICE WITH CONVECTION POWERED FAN AND WATER RESERVOIR

[76] Inventor: Saeed Shariat, # 1 Chestnut La., Rolling Hills, Calif. 90274

[21] Appl. No.: 09/098,915

[22] Filed: Jun. 17, 1998

[51] Int. Cl.⁶ .................................. A21B 1/52; A47J 27/00
[52] U.S. Cl. ..................................... 126/275 R; 126/21 A; 126/27; 99/447; 99/446
[58] Field of Search ............................. 126/275 R, 273 R, 126/21 A, 25 R, 27; 99/447, 446, 425, 444, 422, 401; 219/386, 400

[56] References Cited

U.S. PATENT DOCUMENTS

| | | | |
|---|---|---|---|
| 1,036,148 | 8/1912 | Reina | 126/275 R |
| 3,301,172 | 1/1967 | Haro | 99/447 |
| 3,414,708 | 12/1968 | Maier | 126/21 A |
| 4,034,663 | 7/1977 | Jenn et al. | 126/21 A |
| 4,287,870 | 9/1981 | Johnson | 126/25 C |
| 4,430,559 | 2/1984 | Rabay | 219/400 |
| 4,553,525 | 11/1985 | Ruble | 126/30 |
| 4,862,795 | 9/1989 | Hawkins | 99/446 |
| 4,976,252 | 12/1990 | Cianciola | 126/27 |
| 5,466,912 | 11/1995 | Dornbush et al. | 126/21 A |
| 5,555,795 | 9/1996 | Tsai | 126/275 R |
| 5,579,680 | 12/1996 | Graur | 126/275 R |
| 5,620,623 | 4/1997 | Baker | 126/21 A |
| 5,682,811 | 11/1997 | Kidushim | 126/27 |
| 5,682,873 | 11/1997 | Chambers | 126/275 R |

OTHER PUBLICATIONS

"Chefmaster Smokeless Indoor Grill", a one page document printed Mar. 15, 1998 from the Internet Web site with the address http://www.shopsite.com/wincom/aisle0.html.

Primary Examiner—Ira S. Lazarus
Assistant Examiner—Josiah Cocks
Attorney, Agent, or Firm—Stephen Donovan

[57] ABSTRACT

A cooking device suitable for barbequing food while indoors, used in conjunction with an external heat source. The cooking device comprises a water containing drip pan, a pin attached to a bottom of the drip pan and a multiblade fan rotational on the upper end of the pin. The fan rotates under the influence of convection currents generated when the external heat source is activated. A food substance placed in proximity to the upper surface of the fan is cooked by the heat generated by the external heat source, and air currents produced by the rotating fan force fumes and smoke due to the cooking of the food substance up and away from the drip pan.

18 Claims, 6 Drawing Sheets

COOKING DEVICE WITH CONVECTION POWERED FAN AND WATER RESERVOIR

BACKGROUND

The present invention relates to a portable cooking device. In particular the present invention relates to a portable, exterior heat source powered barbeque with a convection current powered, multiblade fan.

Food can be cooked by being barbequed. Food is barbequed by suspending or holding the food above but not in contact with a heat source, such as by placing the food on a grill or grate. Fat, juices and grease released by the food as it is cooked do not remain in contact with the food but can drip away through holes in the grill.

Although barbequing food imparts a unique flavor to and is a relatively simple way to cook food, a number of problems exist with current devices and methods used for barbequing food. First, the indoor barbequing of food has been severely limited due to the smoke and gaseous combustion products generated by the barbequing process.

Second, a barbeque apparatus can be a bulky, expensive device with, for example, its own gas supply, controls, support frame and wheels, hood and side arms such that it cannot be afforded by low income earners or used by space limited apartment dwellers. Third, use of a barbeque traditionally requires at least some outdoor space such as a backyard or patio. Persons who live in proximity to others who may object to the smoke and odors generated by outdoor use of a barbeque can be denied participation in the health benefits and enjoyment that can result from barbequing food.

Fourth, food, especially meat and meat products, can be burnt as the food is barbequed because of the phenomenon known as flaming, which can present a significant problem when food is barbequed. Flaming is the uncontrolled ignition of flames or fire due to the combustion of the fat and grease which drips onto the heat source from the food being barbequed. This can result in charred food that is burnt on the outside and uncooked on the inside. While the placing of a metal or reflector sheet between the heat source and the food product resting upon a grill can solve the charring problem by preventing the fat from contacting the heat source, such an interposed sheet also effectively prevents the food product from being cooked by the heat.

Additionally, even if some form of drip intercepting, but heat permeable sheet could be interposed between the heat source and the dripping meat, so that the dripping grease does not fall directly down to contact the heat source (eliminating flaming therefore) but the heat could reach and cook the meat, there is then the greater problem which arises as to disposal of the grease which accumulates on any such interposed sheet. If the grease simply builds up on the sheet until it spills over onto the heat element below then a highly combustible fire hazard situation has been created. Additionally, there is the problem of finding a sheet of material which can catch and/or dispose of the dripping grease while still permitting the heat through to the food above. A simple solution has been to use no interposed sheet but to wrap the food in tin foil or other suitable material or to place a metal cover over the meat and the top of the grill to try and better distribute the heat and prevent burning and uneven cooking.

Known barbeques have many drawbacks and deficiencies. U.S. Pat. No. 4,034,663 issued to Jenn et al discusses a cooking device which includes a ventilated portable electric grill with an internal heating element with a drain pan to collect grease and food drippings and an electrically power fan to draw smoke and cooking fumes away from the grate into a exhaust pipe. Jenn requires an internally powered (electric) grill element and also must have a source of electricity to power a fan to rotate fast enough to remove smoke and cooking gases from the vicinity of the grill.

U.S. Pat. No. 4,430,559 issued to Rabay discusses a portable cooking device for indoor use having a convection current powered rotating perforated disc balancing upon an upright bearing pin where the rotating perforated disc provides an indirect path for rising hot air (from a heat element internal to the cooking device) between the heating element and the food which is being cooked and helps to produce a uniform distribution of the heat and less meat charring and uneven meat cooking. The convection powered fan of Rabay does not turn fast enough to either force smoke up and away from the cooking device or to generate enough centrifugal force to cause fat to slide away into the bottom of a drip pan.

U.S. Pat. No. 5,682,811 issued to Kidushim discusses a portable, cooking device for indoor use over the burner of a stove having a base with a water reservoir into which high surface area stones are placed. The Kidushim invention has a grill panel with a raised central crest to allow fat to drip off. Such a raised or curved grill can result in uneven heating of the food because the distance from the heat source is different for different areas of the curved grill. Additionally, a curved top plate is less stable than a flat one and is more prone to be knocked off or to fall off the drip pan because a curved top plate can have less surface contacting the top of the barbeque.

What is needed therefore is a cooking device suitable for use as an indoor barbeque which does not require an internal heat source, does not require any electrical or power connections, reduces the risk of flaming and has an effective means for removing smoke and cooking vapors from the vicinity of the barbeque.

SUMMARY

The present invention meets this need and provides a cooking device suitable for use as an indoor barbeque which does not require an internal heat source, does not require any electrical or power connections, virtually eliminates the risk of flaming and has a highly effective means for removing smoke and cooking vapors from the vicinity of the barbeque.

The risk of flaming is reduced by interposition between an external heat source and the food to be cooked of an element which intercepts and directs to a water reservoir the fat which drips from food being barbequed without preventing the heat from reaching the food and evenly cooking it.

A cooking device within the scope of the present invention is a portable cooking device for barbequing food with four essential elements these being firstly a pan with a bottom wall and a side wall. The bottom wall and the side wall of the pan define an open space within the pan. The bottom wall of the pan also has a central aperture sized for placement over an external, heat source. The second essential element is a fan support attached to the pan. The fan support is positioned at approximately the middle of the central aperture in the bottom wall of the pan. The third essential element of the present cooking device is a fan support attachment means for attaching the fan support to the pan. The fan support attachment means is securely connected to both the pan and to the fan support. Finally, there is a convection current powered, multiblade fan that can rotation while in contact with the fan support.

The multiblade fan is located entirely within the open space of the pan, above and overlaying the central aperture.

Hot air convection currents generated by activation of an external heat source cause the multiblade fan to rapidly rotate upon the fan support and thereby permit barbequing and even cooking of a food substance placed above and in proximity to the rotating fan.

The fan support attachment means can be a rectangular, heat resistant band which transversely spans the central aperture in the bottom wall of the pan. The fan support can be an upright rod which has a first end and a second pointed end. The first end of the rod is attached to the band while the second end of the rod is in contact with the multiblade fan. The upright rod extends vertically upright from the rectangular band by less than a vertical height of the side wall of the pan.

The bottom wall of the pan can have a ridge located along the circumference of the central aperture. The ridge serves to retain water placed in the bottom of the pan. Importantly, circumferences of both the multiblade fan and of the central aperture define circles of substantially equal diameter.

The multiblade fan can have an upper surface and a lower surface where the lower surface of the fan is in a removable, supporting contact with and rotational in a generally horizontal plane upon a pointed upper end of the fan support. The combined height from the bottom wall of the pan to the upper surface of the multiblade fan resting upon the fan support is less than the vertical height of the side wall of the pan.

The multiblade fan can have from about 10 to about 25 similarly orientated blades, each blade being inclined by substantially the same acute angle of between about 10 degrees and 50 degrees above a horizontal plane established by the upper surface of the fan. Preferably, the multiblade fan has from about 15 to about 20 blades and each blade is inclined at an angle of between about 20 degrees and about 40 degrees.

More preferably, the multiblade fan has from about 18 to about 22 blades and each blade is inclined at an angle of between about 25 degrees and about 35 degrees.

The multiblade fan can also have: an outer ring along the outer periphery of the blades for supporting the blades and holding the blades in a desired angular position without significant movement or deformation when the cooking device is in use; a lip adjacent to the outer ring for making the outer support ring stronger, reducing blade drooping and for keeping steam near the blades; central ring along the inner blade periphery for additional blade position support and blade angular deformation reduction, and; a nipple located at approximately the center of the central ring, the nipple rising above the central ring, and an underside of the nipple providing an area of virtually frictionless contact between the fan and the pointed upper end of the upright rod.

The multiblade fan can rotate in a clockwise direction at a speed of between about 40 r.p.m and about 80 r.p.m. and more preferably at a speed of between about 60 r.p.m. and about 80 r.p.m.

A detailed embodiment of the present invention can be a portable cooking device for barbequing food made up of: (a) a pan with a bottom wall and a side wall, the bottom wall and the side wall of the pan defining an open space within the pan, the bottom wall of the pan having a central aperture sized for placement over an external, heat source, the bottom wall of the pan further comprising a ridge located along the circumference of the central aperture, the ridge serving to retain water placed in the bottom of the pan; (b) a fan support attached to the pan, the fan support being positioned at approximately the middle of the central aperture in the bottom wall of the pan, the fan support being an upright rod which has a first end and a pointed second end, the first end of the upright rod being attached to a fan support attachment means; (c) a fan support attachment means for attaching the fan support to the pan, the fan support attachment means comprising a rectangular, heat resistant band which transversely spans the central aperture in the bottom wall of the pan the band being securely connected to both the pan and to the fan support, and, the first end of the upright rod being attached to the band; (d) a convection current powered, multiblade fan being in rotational contact with the pointed second end of the upright rod, disposed entirely within the open space of the pan, above and overlaying the central aperture, and circumferences of both the multiblade fan and of the central aperture defining circles of substantially equal diameter. Wherein the multiblade fan comprises:

(i) an upper surface and a lower surface, the lower surface of the fan being in removable, supporting contact with and rotational in a generally horizontal plane upon a pointed upper end of the fan support, and wherein the combined height from the bottom wall of the pan to the upper surface of the multiblade fan resting upon the fan support is less than the vertical height of the side wall of the pan, (ii) from about 18 to about 22 blades, each blade being inclined at an angle of between about 25 degrees and about 35 degrees above a horizontal plane established by the upper surface of the fan, (iii) an outer ring along the outer periphery of the blades for supporting the blades and holding the blades in a desired angular position without significant movement or deformation when the cooking device is in use.

(iv) a lip adjacent to the outer ring for making the outer support ring stronger, reducing blade drooping and for keeping steam near the blades, (v) a central ring along the inner blade periphery for additional blade position support and blade angular deformation reduction, (vi) a nipple located at approximately the center of the central ring, the nipple rising above the central ring, and an underside of the nipple providing an area of virtually frictionless contact between the fan and the pointed upper end of the upright rod, wherein the multiblade fan can rotate in a clockwise direction at a speed of between about 60 r.p.m and about 80 r.p.m., and;

(e) a food supporting means covering the open top of the pan.

An alternate embodiment of the present invention can be an exteriorly powered cooking device comprising: (a) a sheet metal drip pan formed to have; (i) an open top (ii) a base or bottom wall with a circular opening, the center of the circular opening being positioned at approximately the center of the bottom wall adapted to fit over a conventional stove top circular heat element (iii) at least one side wall integral with the bottom wall forming a housing and defining an open space interior to the side wall, the drip pan being capable of containing water at the bottom of the drip pan; (b) a heat resistant band with a first end, and a second end, the band being disposed transversely across the circular opening in the bottom all of the drip pan, and the ends of the band being securely attached to the bottom wall of the drip pan; (c) a pin having a lower end and a pointed upper end, the lower end of the pin being securely attached through or at approximately a center of the band so that the length of the pin which extends vertically upright from the band is less than a vertical height of the side wall of the drip pan, the pin thereby extending rigidly in an upright manner from approximately the center of the bottom wall of the drip pan, and; (d) a multiblade fan with an upper surface and a lower surface, the lower surface of the fan being in removable supporting contact with and rotational in a generally horizontal plane upon the pointed upper end of the pin, the combined height from the bottom wall of the drip pan of the fan and of the pin upon which the fan rests being less than the vertical height of the side wall of the drip pan, The alternate cooking device can have (a) the pan with four sides walls disposed at right angles to each other; (b) the pin is an upstanding bearing pin received in an indentation formed in the lower surface of the fan and the fan balances on the bearing pin (c) the multiblade fan in rotational contact with the pointed second end of the upright rod, disposed entirely within the open space of the pan, above and overlaying the central aperture, and circumferences of both the multiblade fan and of the central aperture defining circles of substantially equal diameter.

Also within the scope of the present invention is a method for using the disclosed cooking device, the method comprising the steps of: (1) locating the hole in the bottom of the drip pan over an external heat source; (2) adding water to the drip pan; (3) activating the external heat source; (4) placing a comestible on the grill, and; (5) periodically adding additional water to the drip pan, thereby cooking the comestible and rendering it suitable for human consumption.

DRAWINGS

These and other features, aspects, and advantages of the present invention can become better understood from the following description, claims and the accompanying drawings where:

DESCRIPTION

Figure 1:
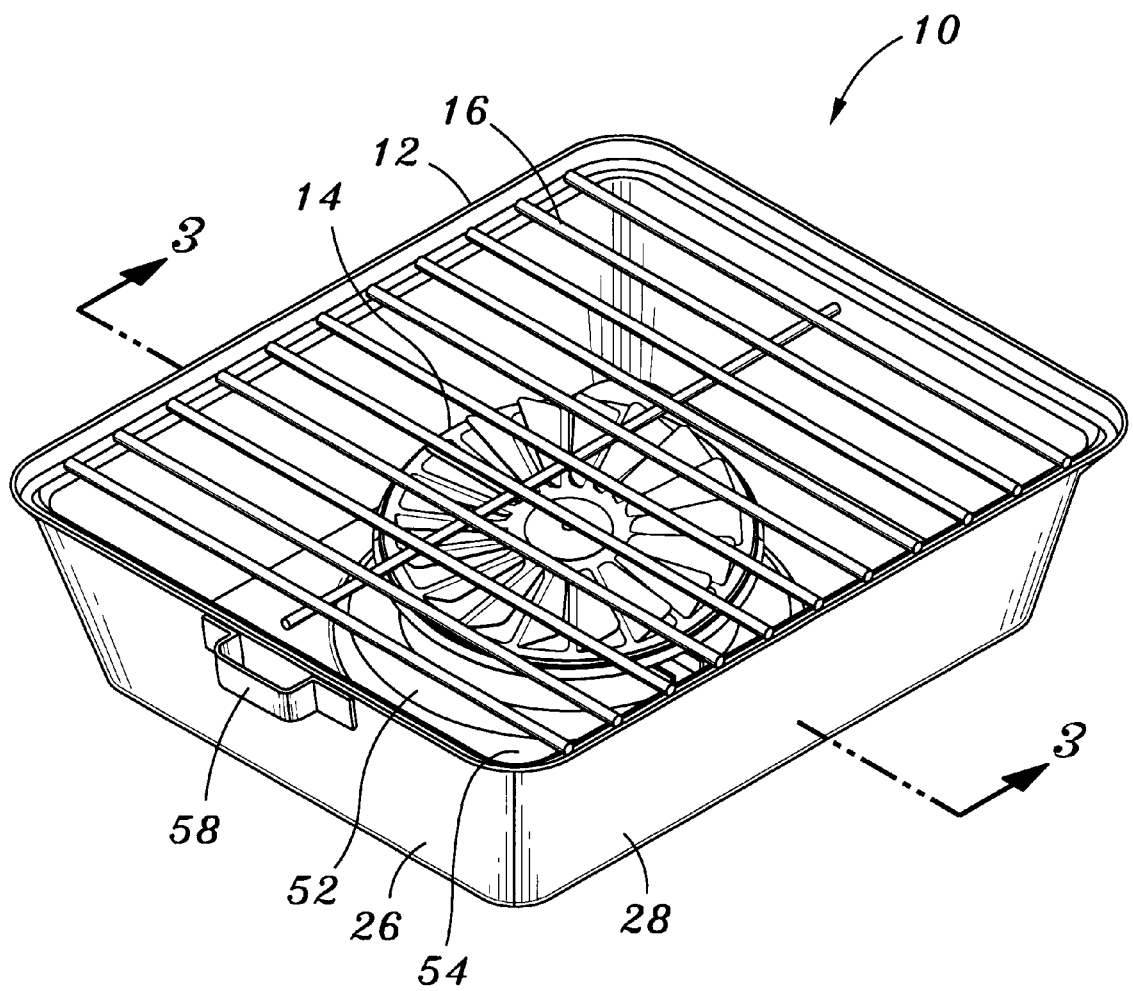
FIG. 1 is a perspective view of an embodiment of a cooking device within the scope of the present invention.

The present invention is based upon the discovery that a cooking device suitable for use as a portable indoor barbeque which does not require any internal (to the cooking device) heat source, does not require any electrical or power connections, which has virtually eliminated flaming and food charring, has even food cooking, and has an efficient removal of smoke and cooking generated fumes from the vicinity of the cooking device, can be made by use of a drip pan with a water reservoir located along the bottom wall of the drip pan, where the drip pan has in its bottom wall a central aperture adapted to fit over an external heat source such as a stove top electric or gas element and over the central aperture there is located a self balancing, convection air current powered, multiblade fan sized to overlay all or substantially all of the opening which is the central aperture and the multiblade fan is rotatable at a speed high enough to force the cooking smoke and fumes away from the cooking device, and to spin fat and grease which drips off the cooking food and onto the fan into the water reservoir, without preventing even cooking of the food located above the fan.

A cooking device within the scope of the present invention is used to evenly cook food such a meat or vegetables by barbequing the food and the cooking device is powered by an external heat source such as an electric or gas stove or element, an indoor or outdoor fireplace, fire ring, campfire and the like which uses wood, charcoal or other suitable fuel. The cooking device is placed over the external heat source and can be used in conjunction with an overhead exhaust fan common to indoor stoves. The overhead exhaust fan of the stove draws the smoke and fumes generated by the cooking of food on the cooking device into the stove's exhaust vent. The bottom of the drip pan is placed on either an old style (raised coil) electric element or over a store's gas burner flame coil. The cooking device can be used outdoors, for example by being placed over burning wood or charcoal.

The present invention encompasses a cooking device with a drip pan for barbeque cooking indoors on an existing gas or electric heating element. The drip pan can be substantially rectangular in plan view and has a water well concavity or reservoir which extends radially along the bottom wall of the drip pan and sized In depth to receive water up to the height of a ridge which circumscribes an aperture in the bottom wall of the drip pan, the aperture fitting over the heating element.

A multiblade fan is suspended above the central aperture and rotates due solely to the influence of convection air currents which rise from the heating element into the drip pan. The multiblade fan is essential to the function of the cooking device and has several important functions, including: (1) attenuation of the heat from the heating element before the heat reaches a food item to be cooked located above the fan thereby reducing overcooking of the food; (2) dispersal or atomization of fat and grease which strikes the fan from the cooking food; (3) deflection of the fat and grease into the water reservoir; (4) mixing of hot air rising from the heating element with cooler air drawn into the drip pan by the rotation of the fan, thereby again promoting even cooking of the food throughout, and; (5) compelling smoke and fumes and gases generated by the cooking food up and out of the drip due to the air flow produced by the rotating fan.

As illustrated by FIG. 1, An embodiment of a cooking device 10 within the scope of the present invention comprises a drip pan 12 and a multiblade fan 14. The cooking device 10 can also include a flat throughout or horizontal plate or grill 16 for supporting a food item such as a meat product or vegetables. The openings in the grill 16 are not so large as allow all or most of the food to be cooked to fall through the grill. Preferably, the grill 16 is flat, not sloped in the middle, so as to promote even dripping of the fat onto the fan below the grill. Preferably, the grill 16 is made of a metal such as steel or iron formed into a ring or square with a plurality of crossbars. The grill is removable and spans the open top of the pan 12. The periphery of the grill fits over and rests on a transverse flange or shoulder 18 located on at least two opposite upper and inner sides of the pan 12 and which act to support the grill. Alternately, clips can be used to hold the grill in place on the drip pan 12. The grill or top plate 16 can be dispensed with when, for example cooking shish kebabs on a skewer.

Figure 2:
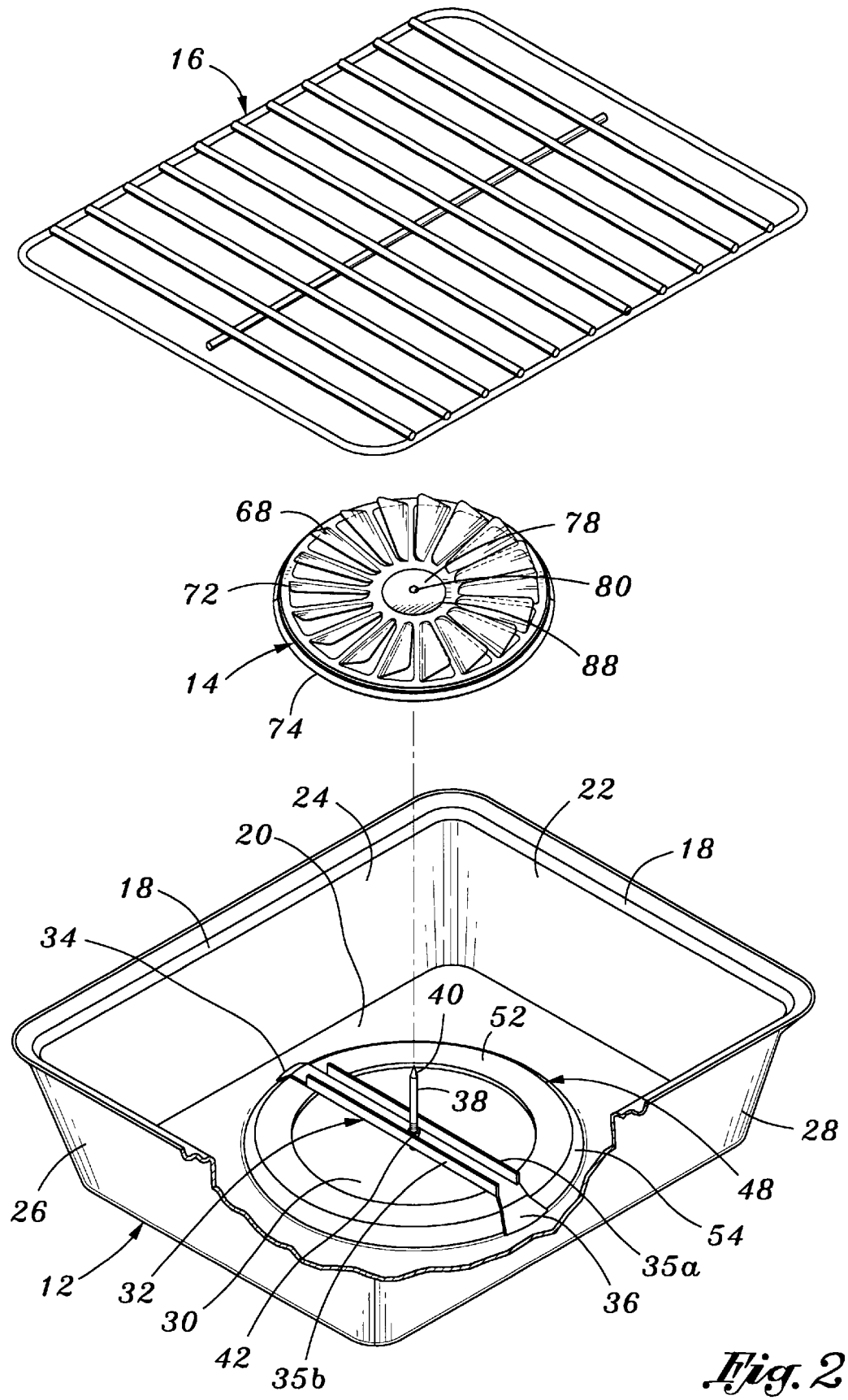
FIG. 2 is an exploded view of the embodiment illustrated by FIG. 1 with a partial cut away of the drip pan.

The drip pan 12 can have a bottom wall which is circular, oblong, rectangular or square in shape. As shown by FIG. 2, preferably, the drip pan 12 has a bottom wall 20 and four essentially side walls 22, 24, 26 and 28 orientated at right angles to each other. The housing which comprises the drip pan 12 can be made of a durable and heat resistant material, preferably metal because of its ductility and the sides walls 22–28 are preferably integral with the bottom wall 20. A circular opening 30 in the bottom wall 20 of the drip pan 12 is sized so that the opening 30 fits over or above a raised coil electric stove element or conventional gas ring 31 of a stove 33

The angle α between a horizontal surface established of the top of the drip pan (i.e the plane formed by the grill 16 resting on the open top of the drip pan 12 against the shoulder 18) and the side wall of the drip pan is preferably about 80 degrees so that the grill can be adequately supported by such outwardly sloping drip pan side walls and for the enhanced water reservoir volume which results, as compared to vertical drip pan side walls.

Figure 8:
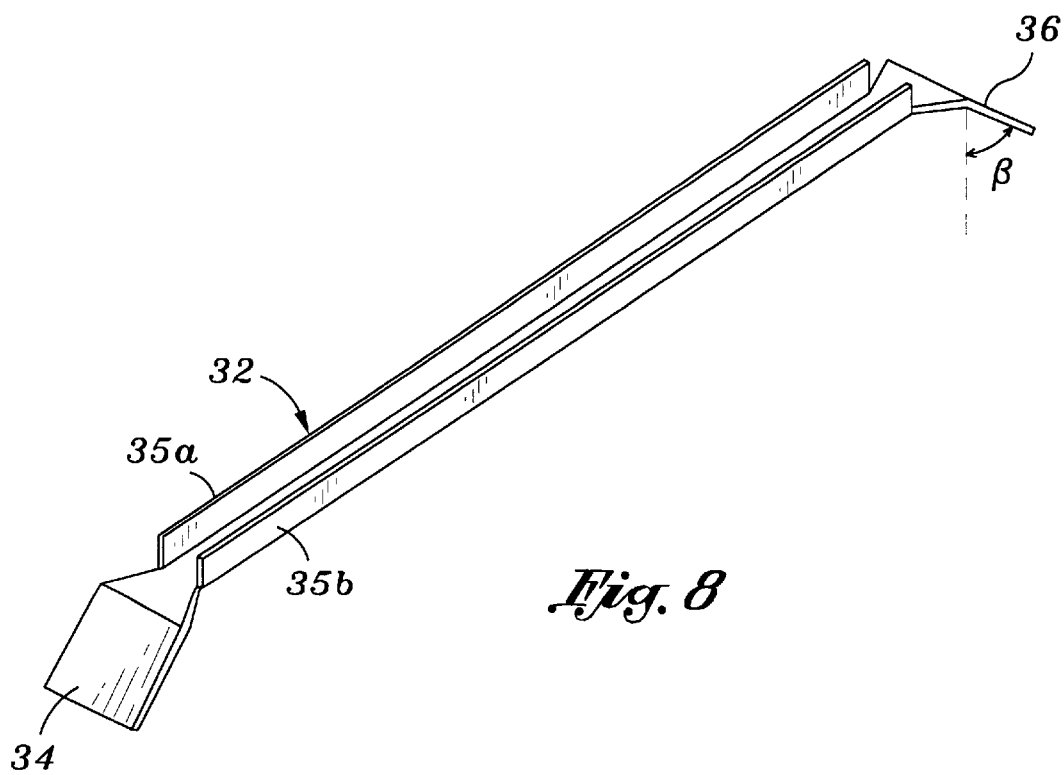
FIG. 8 is a perspective view of the fan support attachment mean shown in FIG. 2.

A fan support attachment means such as a rectangular band 32 is disposed transversely across the opening 30 in the bottom of the drip pan 12. The band 32 has opposite ends 34 and 36 which are securely attached to the bottom wall 20 as by spot weld or by tension lock and key into a suitable orifice in the bottom of the drip pan 12. Preferably, the band 32 runs across the center of the opening 30. The band 32 can have side rails 35a and 35b which serve to strengthen the band and to channel fat which may drop onto the band into the water reservoir 50, as shown in detail by FIG. 8. The angular orientation of the ends 34 and 36 of the band 32 while horizontal can be in relation to a vertical axis an angle β which is preferably between about 30 degrees and about 50 degrees so that the ends 34 and 36 can be securely fitted over a ridge component 56 or 54, as explained below.

A fan support 38 with an upper end 40 and a lower end 42 is attached to the band 32 at its lower end 42. The fan support 38 can be an upright bearing pin or rod with a threaded lower end inserted through the band 32 and attached thereto by use of nuts 44 and 46. Alternately, the fan support 38 can be spot welded to the band 32. The fan support 38 is preferably attached to the band 32 at approximately the center of the long axis of the band 32. The fan 14 balances on and rotates freely on the supporting pin 38.

Figure 5:
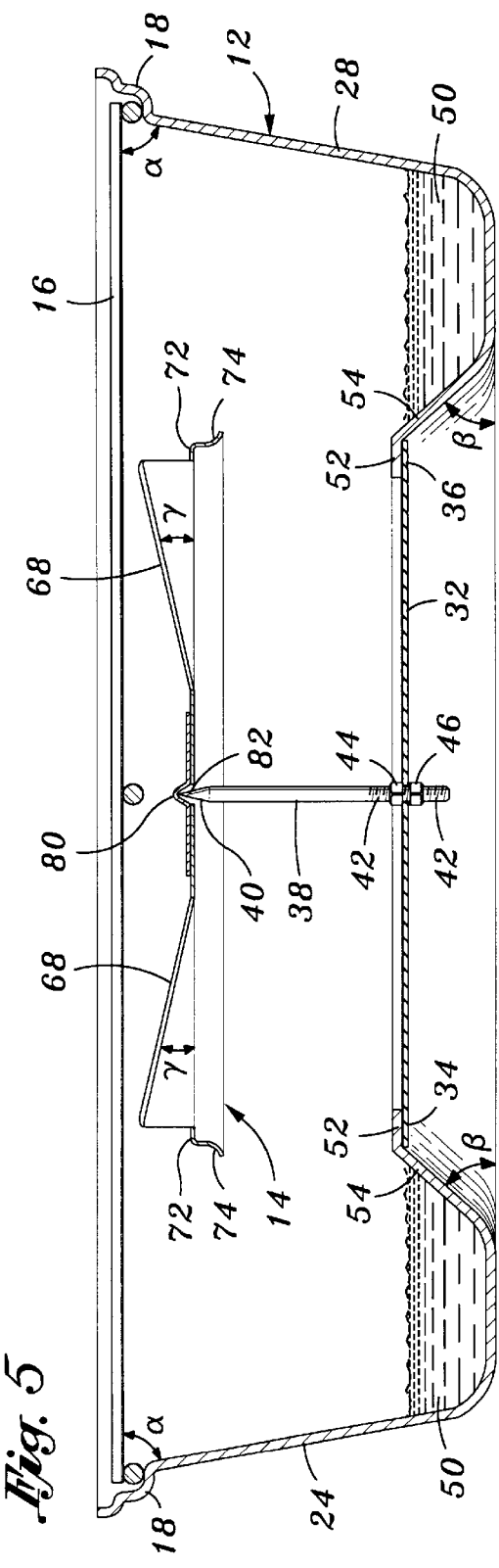
FIG. 5 is a cross sectional view taken along the line 3—3 in FIG. 1.
Figure 6:
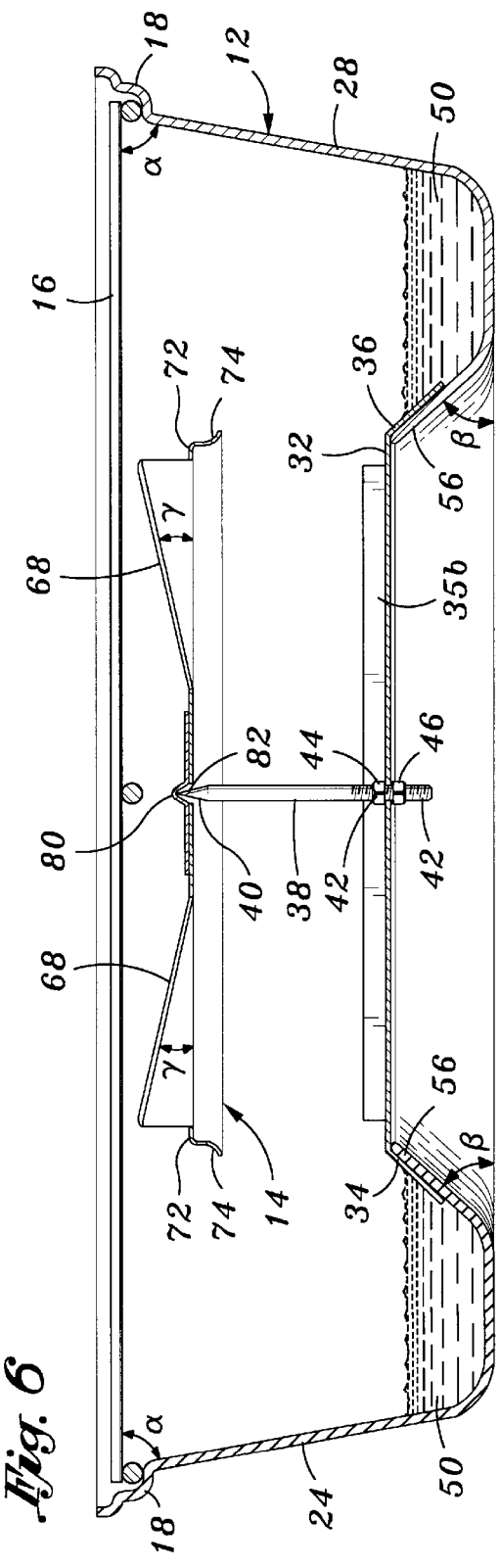
FIG. 6 is a cross sectional view taken along the line 3—3 in FIG. 1 showing a preferred embodiment of the cooking device.

A ridge 48 formed in the bottom 20 of the drip pan 12 acts to retain water 50 placed in the bottom of the drip pan 12. As illustrated best by FIGS. 2 and 5 the ridge 48 can have an upper horizontal ring portion 52 and a lower vertical or acute angle β (about 45 degrees) inclined (as measured from the floor of the drip pan) portion 54 where the upper portion 52 of the ridge 48 assists retention of the drip pan 12 on the raised coil of an external heat element, such as electric stove raised coil element. Thus, the ridge 48 can provide an area of secure contact between the bottom 20 of the drip pan 12 and the periphery of an electrical coil element or of a gas stove element external to the drip pan. The ends 34 and 36 of the band 32 can be attached to an underside of the drip pan bottom as shown by FIG. 5. Preferably. the ridge 48 comprises a single acute angle β (about 45 degrees) wall 56 rising from the floor of the drip pan 12, and the ends 34 and 36 of the band 32 are attached to an upper side of the bottom wall 20 of the drip pan 12 as shown by FIG. 6. Such a preferred ridge embodiment and band 32 attachment permits more water to be placed in the drip pan (as compared to a situation where the angle β is a right angle), and permits a more secure attachment of the band since the band is now not attached in a position as proximate to the heat from the external heat element. When the angle β is about 45 degrees the water present is able to be positioned closer to the external heat source. the water heats faster and the production of more steam from drip pan water, results. An additional benefit of having a ridge 48 in the bottom of the drip pan, beyond that of water retention, is that, as is well known in the metal fabrication art, bending, undulating or ridging a metal's (such as steel) shape can provide a stronger and more break resistant metal piece.

It is important that a suitable amount of water 50 be placed in the drip pan 12 below the level of the fan 14. The water acts to collect and cool fat which drips from the cooking food. Additionally, the water also produces steam 56 which upon rising from the water 50 can help to guide smoke out of the drip pan. The steam 56 rising from the drip pan also speeds and assists cooking of the food on the grill 16 while helping to prevent the cooking food from drying out. Preferably, the bottom wall 20 of the drip pan is flat and not sloped because there is no need to have a sloped bottom wall for the collection of grease towards a drain or into any grease jar. A sloped drip pan bottom would undesirably draw the water placed in the bottom of the drip pan away from the ridge 48 in the bottom of the drip pan and it is important that the water stay in contact with the ridge 48 and be dispersed as an even depth layer over the bottom of the drip pan 12. The water is preferably in contact with all of the bottom 20 of the drip pan 12 to an approximately equal water depth (except right next to the ridge) so that the water heats up evenly and produces an even distribution of steam to rise towards the food above. The angle β formed between the bottom wall of the drip pan and the side of the ridge 56 is preferably about 45 degrees to obtain the desirable results set forth above, including increased water reservoir volume and enhanced heat transfer from the heat element to the water 50.

The depth of the water 50 in the drip pan 12 is such that items such as stones or rocks cannot feasibly be put into the water without causing the water to overflow onto the heat source, which would reduce the amount of heat being produced. The drip pan 12 is filled with water to the brim of the ridge 48 to maximize heat transfer to the water and steam production by the heated water. Additionally, the maximum volume of water is required to effectively absorb the fat drippings. The drip pan 12 can have porcelain or heat resistant handles 58 which can allow a metal drip pan to be easily picked up during or after its use.

Figure 3:
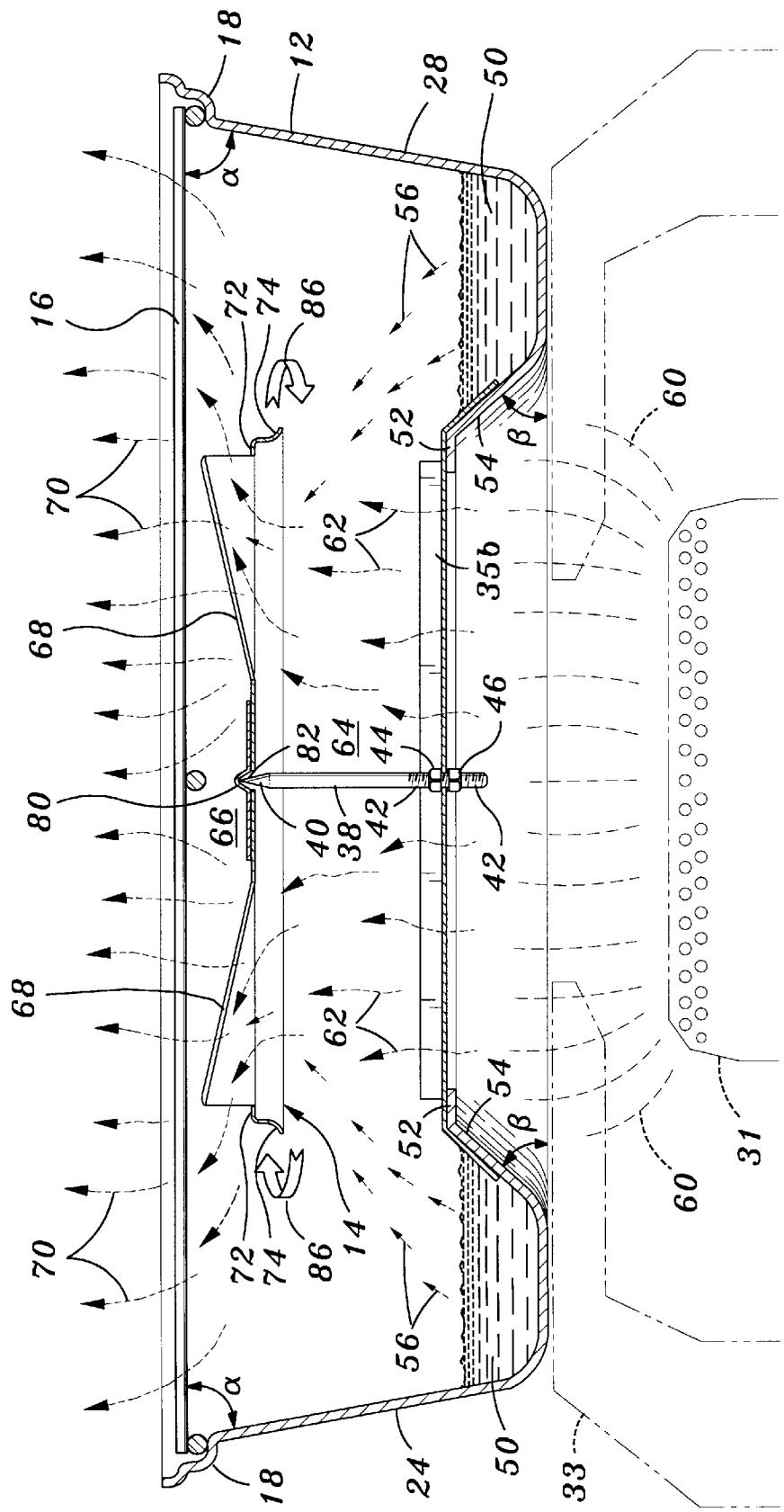
FIG. 3 is a cross sectional view taken along the line 3—3 in FIG. 1 showing water in the drip pan.

As shown by FIG. 3, the external heat source 31 generates radiant heat 60 which heats the air above it and generates a rising column of convection current air 62. For the cooking device to work the air currents 62 generated must continue to rise and escape from the cooking device so that a steady flow of convection currents 62 rises to power the fan 14. The cooking device is therefore preferably not intended to be used with a cover over the top of the drip pan such as would be used to permit baking or roasting food. Covering the top of the drip pan prevents the fan from rotating and the desirable effects obtained thereby (i.e. fat sliding across the fan and into the drip pan, and the smoke and fumes being forced upwards) but will not impede the heat attenuation function of the fan.

There is a first air gap 64 between the top of the drip pan water and the bottom of the fan. Cooler air is drawn into the air gap 64 as the heated air 62 rises and causes the fan 14 to rotate. A second air gap 66 exists between the top of the fan 14 and the grill 16. The opening 30 in the drip pan permits convection currents of hot air 62 to rise and impact the blades 68 thereby causing the fan 14 to rotate. Heat emanating from a burner rises under convection as well as by radiation from the opening 30 in the bottom of the drip pan and heats the air above. The heated air rises and cooler air is drawn into the air gap 64 so that air circulates in a continuous loop between the bottom of the drip pan and the top of the drip pan to assist the cooking of the food substance supported on a grill above the fan. The configuration of the grill permits the heated air to pass both above and below the grill.

Figure 7:
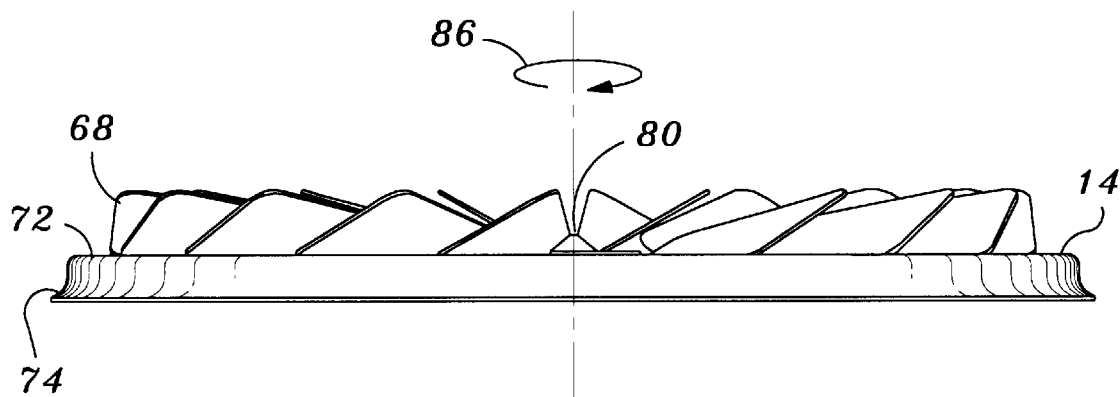
FIG. 7 is a side view of the multiblade fan shown in FIG. 4.

Essential to the function of the cooking device 10 is the multiblade fan 14 located within the open space formed by the housing of the drip pan 12. The fan 14 is interposed between the optional grill 16 (on which a food substance can be placed) and the bottom 20 of the drip pan. The multiblade fan rotates on the upper end 40 of the fan support 38. The multiblade fan 14 has a plurality of similarly orientated blades 68 onto which the hot convection air currents 62 impact causing the fan to rotate as the heat energy of the air currents is translated into the kinetic energy of the fan. No blade touches any other blade. Each blade 68 is a roughly rectangular figure formed by making two cuts at approximately right angles to each other in the surface of the fan and then pushing the scored material upwards until a specific slope of the blade above the upper surface of the fan is obtained. Pushing the scored material upwards from the upper surface of the fan, not only creates a blade 68 but also provides an opening 69 through which air currents 62 can rise. The two cuts made in the upper fan surface result in the blade sides 68a and 68b. All of the blade side 68c and most of blade side 68d remains joined to the upper surface of the fan. Blade sides 68b and 68c are equal in length, while blade side 68d is shorter than blade side 68a. The blades are formed in a radial arrangement around the center of the fan, as shown by FIG. 7.

The rotational speed of the fan 14 depends upon the speed and heat energy contained by the rising air currents. I have found that when the conventional raised electric coil element of an electric stove is turned to "maximum" or "high" the speed of the fan 14 can be as high as 50–80 r.p.m. and can be sustained at about 70–80 r.p.m. as long as the high heat setting is maintained. High fan rotational speeds are required to generate air currents 70 for drawing smoke and fumes up and out of the drip pan due to the force and speed of the air currents generated by the rotating fan. The fan blades 68 are made of a suitable light and heat resistant material, preferably 16–25 gauge steel, with 18 gauge steel being most preferred due to its lightness and durability.

The hot air convection currents 62 which rise from the external heal source 16 through the opening 30 in the drip pan 12 cause the fan 14 to rotate in a clockwise direction as illustrated by arrows 86. In order to impart rotational movement to the fan 14, the blades 68 are all bent upwards so that all the blades 68 are all oriented angularly to the horizontal plane of rotation of the fan and in the same circumferential direction. When the heating element is engages 16, it heats the air above it, which in turn pulls fresh from the sides of the drip pan. The heated air rises and impinges on the lower surface of the blades imparting a clockwise rotational movement to the fan.

The multiple fan blades 68 are all similarly shaped and all have the same angular orientation γ which permits the blades 68 to take advantage of the rising hot air currents 62 so that the impact of the hot air upon the blades of the fan engenders a rapid clockwise rotation of the fan 14. The angle γ is measured from the flat upper surface of the fan to the underside of the inclined blades. Air currents 70 generated by the rotating fan push the smoke up and away from the fan 14. Rotation of the fan 14 forces a stream of air 70 up and away from the fan, carrying smoke and gas generated by the cooking food with it. The mixed air smoke stream 70 is then drawn into the stove's overhead exhaust fan (not shown).

The angle γ of the blade 68 can be as little as 10 degrees and as much as 70 degrees above a plane established by the upper surface of the fan and the fan will still function. Preferably, the blade angle γ is between about 20 degrees and about 40 degrees. More preferably, the blade angle γ is between about 25 degrees and about 35 degrees. Most preferably, the blade angle γ is about 30 degrees. There can be as few as 5 blades and as many as 40 blades. Preferably, the fan has from about 15 to about 25 blades. The orientation γ of the fan blades 68, the number of blades 68 and there arrangement makes both a high speed of fan rotation possible and provides openings (due to the orientation of the blades 68 above the horizontal plane of the fan by the angle γ) for the heated air currents 62 to come through from the heat element below the fan onto the meat to be cooked above the fan. The more heat that is supplied the faster the fan 14 turns.

The fan 14 can catch grease and fat which drips off cooking food and move the grease off into the drip pan water. This occurs due to the centrifugal force generated by the rotation of the fan 14. When the dripping fat strikes the spinning fan, the fat which is not atomized by contact with the hot fan is compelled to the outer edge of the fan and spun off the fan 14 into the water reservoir 50. The fan 14 also promotes an even heat distribution onto the food substance. The grease moving function of the fan 14 in particular requires that the fan rotate at a high speed. Because the fan 14 is caused to rotate solely due to the action of and transfer of heat energy from the convection air currents 62, the fan must have a large number of large surface area, carefully orientated and disposed blades 68. Simple perforations or circular cusps in a disc would not, under the effect of convection air currents, be able to produce sufficient fan rotational speed for this grease removal purpose.

Not only does the fan 14 shoot the grease off into the drip pan water, it also can disperse and atomize the grease which falls on it due to the temperature of the fan (the fan has been heated up by the heat source) and due to the speed of the rotating fan blades which the falling grease strikes. This effect results in very small grease droplets which are then dispersed by the air currents created by the rotating fan and are carried upwards by the air currents rising up from the fan. Any grease which does pass through the fan and fall onto the heat element is too small in size (i.e. no large drops) to cause any flaming.

Thus, the fan 14 has several important functions. First, it acts as a heat break between the heat source and food to be cooked on the grill. Thus, the physical presence of the fan 14 between the heat element and the food substance attenuates the direct effect of the heat upon the food. This factor as well as the flow patterns generated by the fan help to produce a uniform heating pattern on the food substance. There is therefore no need to wrap the food in tin foil or to place a metal cover over the meat to try and better distribute the heat and prevent burning and uneven food cooking.

Second, since the fan 14 overlays the opening 30 in the bottom of the drip pan, the fan 14 prevents the dripping fat from contacting the heat element. Third, the high rate of rotation of the fan creates a significant centrifugal force which causes fat which contacts the fan to be shot off into the water in the bottom of the drip pan beyond the circumference of the fan. These two factors (the physical size

[matching the size of the opening 30 in the bottom of the drip pan] and location of the fan 14 over the opening 30 in the bottom of the drip pan and the high rotational speed of the fan) virtually eliminate fat contact with the heat element and thereby virtually eliminate flaming and meat charring. Thus, because the fan 14 is sized and positioned to overlay the opening 30 in the bottom of the drip pan 12 (the opening 30 itself fitting over the external heat element) little or no fat pass through the fan to the heat element below.

Figure 4:
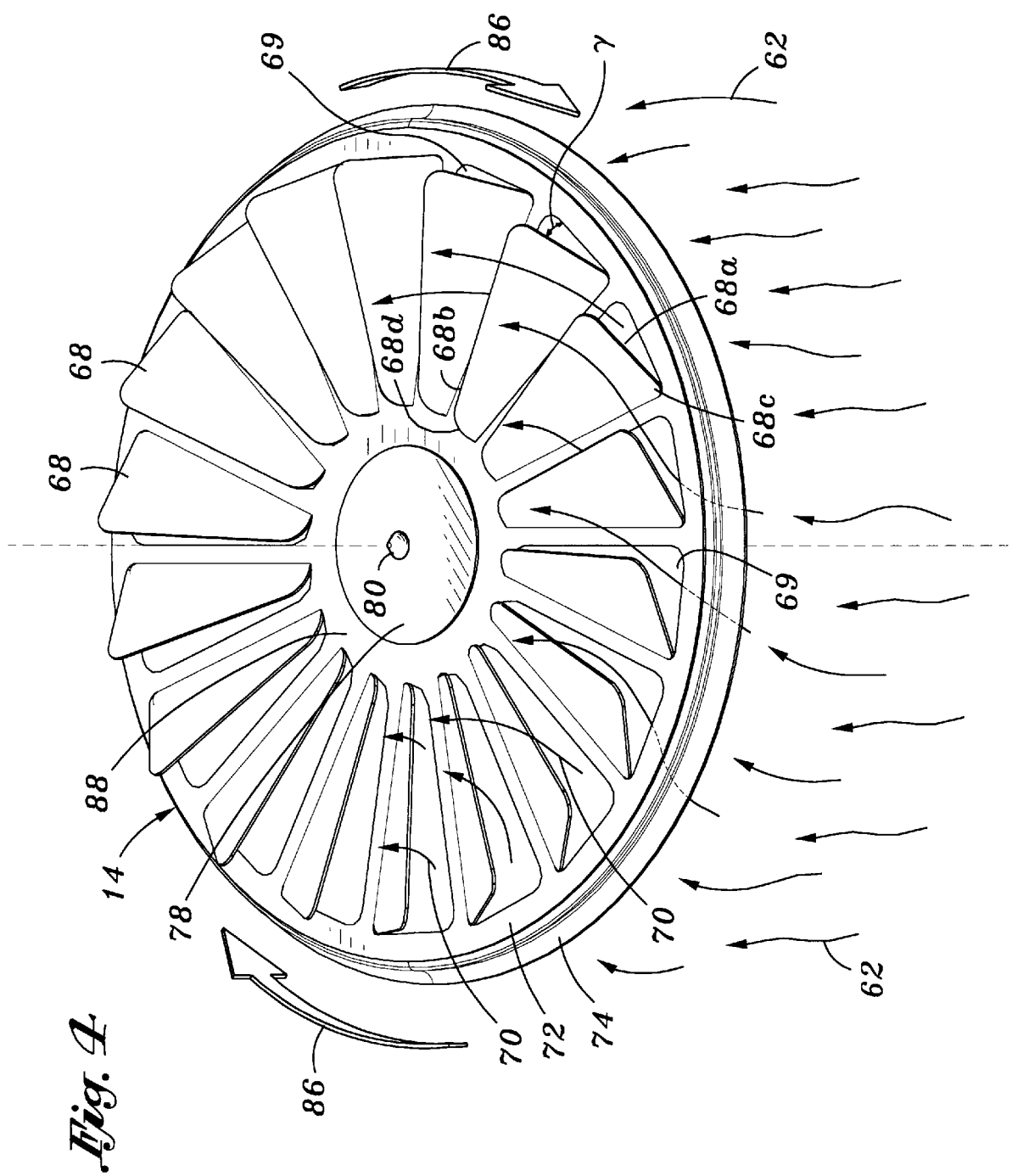
FIG. 4 is perspective view of an enlarged perspective view of the multiblade fan shown in FIG. 1.

The fan 14 balances on the bearing pin 38, the pointed upper end 40 of which engages the apex of a cone shaped hub 78 (see FIG. 4). Since the area of contact between the bearing pin 38 and the hub 78 is minimal, the fan 14 is able to rotate freely. The components of the fan can include the plurality of blades 68; an outer ring 72 for supporting the blades and holding the blades in a desired angular position without significant movement or deformation when the cooking device is in use. The fan 14 can also include a lip 74 which makes the outer ring 72 stronger and reduces blade drooping, The lip 74 also acts to keep steam rising from the water reservoir near the blades 68. The fan 14 also has a central ring 88, the hub 78 of which can contact with the central fan support pin 38. The central ring 88 can provide additional blade position support and blade angular deformation reduction. This is important because as the cooking device is placed in use, the heat can cause the metal (preferably steel) of the fan blades to be deformed were it not for the support provided by outer ring 72 and by the central ring 88. The hub 78 preferably has an indentation 80.

The central pin 38 is attached to the band 32 at a lower end 40 of the pin 38. An upper end of the pin contacts a bottom area of the fan. The upper end 40 of the pin 38 is the only place at which the fan 14 is in contact with any other part of the cooking device. It is important that upper end 40 of the pin 38 contacts the bottom of the fan in such a manner that the fan will not fall 14 off the pin 38 during normal use of the cooking device 10. Additionally, the pin-fan contact must be virtually frictionless so that the fan 14 is easily rotated when hot air currents rise from the heat source impact the blades 68 of the fan 14. I have discovered that to fulfill these purposes the pin can be constructed to have a narrow or pointy upper end 40. This ensures a very small area of fan bottom and pin upper end contact thereby providing a very low friction pin to fan contact.

Preferably, a part of the central hub region area 78 of the fan rises from the bottom of the fan to form an indentation or nipple 80, along the inner surface of which nipple the upper pin end rests and can wanders as the fan turns on the pin. To prevent the pin moving outside the nipple, as the fan rotates on the pin, and the fan falling off the pin, the bottom of the nipple 80 has an orifice 82 in it's underside. The pin is inserted into the orifice 82 to contact the bottom, inner surface of the nipple and the orifice is wider than the pointy upper end 40 of the pin 38.

In a more preferred embodiment, the dome 78 is dispensed with leaving the nipple 80 protruding from the upper central surface of the fan, as shown by FIGS. 3, 5 and 6. The inner diameter of the nipple 80 is greater than the diameter of the upper end 40 of the pin 38, but less than the inner diameter of the dome 78, so that the wandering of the pin is more restricted within the nipple 80 as compared to what it was within the less preferred dome 78.

The area of contact between the pin 38 and the bottom of the fan 14 while it can be through use of a dome, indentation or nipple structure, is preferably not carried out through use of a tubular structure formed out of or attached to the bottom of the fan because a tubular structure would result in a significant area of pin-fan contact with a proportional increase in the amount of friction generated as the fan attempts to turn on the pin. To summarize, the fan 14 comprises: multiple blades 68 with particular structures and orientations; a central ring 88 with a particular structure for upper end supporting pin contact and for blade support; an outer ring 72 for blade support; a circumferential ring or lip 74 to strengthen the outer ring and the help retain steam near the blades.

In use the drip pan 12 of the cooking device 10 is positioned over the heat source. When the heating element is energized, cooler air is drawn through the grill into the air gap between the bottom of the drip pan 12 and the fan 14 where it is drawn up and through the fan by the action of the fan. Where the drip pan is about twelve inches in length and about three inches in height, the ridge 48 can have a height of about ½ to about ¾ inch thereby permitting the drip pan be hold water to a similar depth in the bottom of the drip pan 12. Water is add to the drip pan periodically when it is in use to cook food. The cooking device is very portable and can be readily dismantled for transport, packing and storing.

A cooking device according to the invention disclosed herein has many advantages, including the following:

1. it can be used indoors.
2. the fan pushes smoke up and fat to the side of the fan
3. it is externally powered.
4. food charring is virtually eliminated
5. food is evenly cooked.
6. no internal energy source is required to run the cooking device Although the present invention has been described in detail with regard to certain preferred methods, other embodiments, versions, and modifications within the scope of the present invention are possible. For example, a wide variety of drip pan shapes and number of blades on the multiblade fan are possible.

Accordingly, the spirit and scope of the following claims should not be limited to the descriptions of the preferred embodiments set forth above.

I claim:

1. A portable cooking device for barbequing food, comprising;
   (a) a pan with a bottom wall and a side wall, the bottom wall and the side wall of the pan defining an open space within the pan, the bottom wall of the pan having a central aperture sized for placement over an external heat source;
   (b) a fan support attached to the pan, the fan supper being positioned at approximately the middle of the central aperture in the bottom wall of the pan;
   (c) a fan support attachment means for attaching the fan support to the pan, the fan support attachment means being securely connected to both the pan and to the fan support, and;
   (d) a convection current powered, multiblade fan in rotational contact with the fan support, the multiblade fan being disposed entirely within the open space of the pan, above and overlaying the central aperture, wherein the multiblade fan comprises:
      (i) from about 10 to about 25 similarly orientated blades, each blade being inclined by substantially the same acute angle of between about 10 degrees and 50 degrees above a horizontal plane established by the upper surface of the fan, and (ii) a lip adjacent to an outer support ring of the fan for making the outer support ring of the fan stronger, reducing blade drooping and for keeping steam near the blades, wherein hot air convection currents generated by activation of an external heat source cause the multiblade fan to rapidly rotate upon the fan support and permit barbequing and even cooking of a food substance placed above and in proximity to the rotating fan.

2. The cooking device of claim 1, wherein the fan support attachment means is a rectangular, heat resistant band which transversely spans the central aperture in the bottom wall of the pan.

3. The cooking device of claim 2, wherein the fan support is a upright rod which has a first end and a pointed second end, the first end of the rod being attached to the band, the pointed second end of the rod being in contact with the multiblade fan.

4. The cooking device of claim 3, wherein the bottom wall of the pan further comprises a ridge located along the circumference of the central aperture, the ridge serving to retain water placed in the bottom of the pan.

5. The cooking device of claim 4, wherein circumferences of both the multiblade fan and of the central aperture define circles of substantially equal diameter.

6. The cooking device of claim 5, wherein the fan support extends vertically upright from the band by less than a vertical height of the side wall of the pan.

7. The cooking device of claim 6, wherein the multiblade fan has an upper surface and a lower surface, the lower surface of the fan being in removable, supporting contact with and rotational in a generally horizontal plane upon the pointed second or upper end of the fan support, and wherein the combined height from the bottom wall of the pan to the upper surface of the multiblade fan resting upon the fan support is less than the vertical height of the side wall of the pan.

8. The cooking device of claim 1, wherein the multiblade fan has from about 15 to about 20 blades and each blade is inclined at an angle of between about 20 degrees and about 40 degrees.

9. The cooking device of claim 8, wherein the multiblade fan has from about 18 to about 22 blades and each blade is inclined at an angle of between about 25 degrees and about 35 degrees.

10. The cooking device of claim 9, wherein the multiblade fan further comprises:

an outer ring along the outer periphery of the blades for supporting the blades and holding the blades in a desired angular position without significant movement or deformation when the cooking device is in use.

11. The cooking device of claim 1, wherein the multiblade fan further comprises a central ring along the inner blade periphery for additional blade position support and blade angular deformation reduction.

12. The cooking device of claim 11, wherein the multiblade fan further comprises a nipple located at approximately the center of the central ring, the nipple rising above the central ring, and an underside of the nipple providing an area of virtually frictionless contact between the fan and the pointed upper end of the upright rod.

13. The cooking device of claim 12 wherein the fan rotates in a clockwise direction at a speed of between about 40 r.p.m and about 80 r.p.m.

14. The cooking device of claim 13, wherein the fan rotates at a speed of between about 60 r.p.m. and about 80 r.p.m.

15. A portable cooking device for barbequing food, comprising;

(a) a pan with a bottom wall and a side wall, the bottom wall and the side wall of the pan defining an open space within the pan, the bottom wall of the pan having a central aperture sized for placement over an external, heat source, the bottom wall of the pan further comprising a ridge located along the circumference of the central aperture, the ridge serving to retain water placed in the bottom of the pan;

(b) a fan support attached to the pan, the fan support being positioned at approximately the middle of the central aperture in the bottom wall of the pan, the fan support being an upright rod which has a first end and a pointed second end, the first end of the upright rod being attached to a fan support attachment means;

(c) a fan support attachment means for attaching the fan support to the pan, the fan support attachment means comprising a rectangular, heat resistant band which transversely spans the central aperture in the bottom wall of the pan, the band being securely connected to both the pan and to the fan support, and, the first end of the upright rod being attached to the band;

(d) a convection current powered, multiblade fan being in rotational contact with the pointed second end of the upright rod, disposed entirely within the open space of the pan, above and overlaying the central aperture, and circumferences of both the multiblade fan and of the central aperture defining circles of substantially equal diameter, wherein the multiblade fan comprises:

(i) an upper surface and a lower surface, the lower surface of the fan being in removable, supporting contact with and rotational in a generally horizontal plane upon a pointed upper end of the fan support, and wherein the combined height from the bottom wall of the pan to the upper surface of the multiblade fan resting upon the fan support is less than the vertical height of the side wall of the pan, (ii) from about 18 to about 22 blades, each blade being inclined at an angle of between about 25 degrees and about 35 degrees above a horizontal plane established by the upper surface of the fan, (iii) an outer ring along the outer periphery of the blades for supporting the blades and holding the blades in a desired angular position without significant movement or deformation when the cooking device is in use, (iv) a lip adjacent to the outer ring for making the outer support ring stronger, reducing blade drooping and for keeping steam near the blades, (v) a central ring along the inner blade periphery for additional blade position support and blade angular deformation reduction, (vi) a nipple located at approximately the center of the central ring, the nipple rising above the central ring, and an underside of the nipple providing an area of virtually frictionless contact between the fan and the pointed upper end of the upright rod, wherein the multiblade fan can rotate in a clockwise direction at a speed of between about 40 r.p.m and about 80 r.p.m., and;

(e) a food supporting means covering the open top of the pan, wherein hot air convection currents generated by activation of an external heat source cause the multiblade fan to rapidly rotate upon the fan support and permit barbequing and even cooking of a food substance placed above and in proximity to the rotating fan.

16. An exteriorly powered cooking device, comprising:
(a) a sheet metal drip pan formed to have;
   (i) an open top
   (ii) a base or bottom wall with a circular opening, the center of the circular opening being positioned at approximately the center of the bottom wall adapted to fit over a conventional stove top circular heat element
   (iii) at least one side wall integral with the bottom wall forming a housing and defining an open space interior to the side wall,
the drip pan being capable of containing water at the bottom of the drip pan;
(b) a heat resistant band with a first end, and a second end, the band being disposed transversely across the circular opening in the bottom all of the drip pan, and the ends of the band being securely attached to the bottom wall of the drip pan;
(c) a pin having a lower end and a pointed upper end, the lower end of the pin being securely attached through or at approximately a center of the band so that the length of the pin which extends vertically upright from the band is less than a vertical height of the side wall of the drip pan, the pin thereby extending rigidly in an upright manner from approximately the center of the bottom wall of the drip pan;
(d) a multiblade fan with an upper surface and a lower surface, the lower surface of the fan being in removable supporting contact with and rotational in a generally horizontal plane upon the pointed upper end of the pin, the combined height from the bottom wall of the drip pan of the fan and of the pin upon which the fan rests being less than the vertical height of the side wall of the drip pan,
wherein upon activation of an external heat source, the fan is urged to rotate upon the upper end of the pin by convection currents generated by the external heat source, a food substance placed in proximity to the upper surface of the fan is cooked by the heat generated by the external heat source, and air currents generated by the rotating fan force fumes or smoke generated by the cooking of the food substance up and away from the drip pan.

17. The cooking device of claim 16, wherein:
(a) the pan has four sides walls disposed at right angles to each other;
(b) the pin is an upstanding bearing pin received in an indentation formed in the lower surface of the fan and the fan balances on the bearing pin
(c) the multiblade fan being in rotational contact with the pointed second end of the upright rod, disposed entirely within the open space of the pan, above and overlaying the central aperture, and circumferences of both the multiblade fan and of the central aperture defining circles of substantially equal diameter, wherein the multiblade fan comprises:
   (i) an upper surface and a lower surface, the lower surface of the fan being in removable, supporting contact with and rotational in a generally horizontal plane upon a pointed upper end of the fan support, and wherein the combined height from the bottom wall of the pan to the upper surface of the multiblade fan resting upon the fan support is less than the vertical height of the side wall of the pan,
   (ii) from about 18 to about 22 blades, each blade being inclined at an angle of between about 25 degrees and about 35 degrees above a horizontal plane established by the upper surface of the fan,
   (iii) an outer ring along the outer periphery of the blades for supporting the blades and holding the blades in a desired angular position without significant movement or deformation when the cooking device is in use,
   (iv) a lip adjacent to the outer ring for making the outer support ring stronger, reducing blade drooping and for keeping steam near the blades,
   (v) a central ring along the inner blade periphery for additional blade position support and blade angular deformation reduction,
   (vi) a nipple located at approximately the center of the central ring, the nipple rising above the central ring, and an underside of the nipple providing an area of virtually frictionless contact between the fan and the pointed upper end of the upright rod, wherein the multiblade fan can rotate in a clockwise direction at a speed of between about 40 r.p.m and about 80 r.p.m, the fan comprises (i) 10–25 blades, (ii) 20–40 degree blade angle, (iii) a central ring, (d) indentation on the central ring, (e) outer ring, and (f) an outer ring lip.

18. a method for using a cooking device for the indoor barbequing of food, wherein the cooking device comprises
(a) a pan with a bottom wall and a side wall defining an open space within the pan the bottom wall of the pan having a central aperture;
(b) a fan support disposed at approximately the center of the central aperture in the bottom wall of the pan, the fan support being attached to the pan through a fan support attachment means, and;
(c) a convection current powered, multiblade fan in contact with the fan support, the method comprising the steps of:
   (1) locating the hole in the bottom of the drip pan over an external heat source;
   (2) adding water to the drip pan;
   (3) activating the external heat source;
   (4) placing a comestible on the grill, and;
   (5) periodically adding additional water to the drip pan,
thereby cooking the comestible and rendering it suitable for human consumption.

* * * * *